United States Patent

Stenbäck

[11] 4,080,822
[45] Mar. 28, 1978

[54] LEAK TESTING

[75] Inventor: Erik Åke Stenbäck, Nykoping, Sweden

[73] Assignee: Aktiebolaget Atomenergi, Stockholm, Sweden

[21] Appl. No.: 682,132

[22] Filed: Apr. 30, 1976

[30] Foreign Application Priority Data

May 14, 1975 Sweden ............................... 7505556

[51] Int. Cl.² ............................................. G01M 3/20
[52] U.S. Cl. .................................................... 73/40.7
[58] Field of Search ....................... 73/40.7, 49.2, 49.3

[56] References Cited

U.S. PATENT DOCUMENTS

| | | | |
|---|---|---|---|
| 3,091,114 | 5/1963 | Webster | 73/40.7 X |
| 3,483,735 | 12/1969 | Packo | 73/40.7 |
| 3,572,085 | 3/1971 | Packo | 73/40.7 X |
| 3,572,096 | 3/1971 | Meyer | 73/40.7 |
| 3,721,117 | 3/1973 | Ford et al. | 73/40.7 |

Primary Examiner—Richard C. Queisser
Assistant Examiner—Joseph W. Roskos
Attorney, Agent, or Firm—Burns, Doane, Swecker & Mathis

[57] ABSTRACT

A method of leak testing a transport vessel for radioactive material is disclosed. Tracer gas (helium) and pressurizing driving gas (nitrogen), the latter in condensed form, are introduced into the transport vessel when in open condition. The tracer gas is introduced in a plastic bag which occupies a major part of the interior of the transport vessel the through which the tracer gas diffuses at a low rate. The liquid pressurizing gas is introduced in a smaller vessel. After the transport vessel has been sealed, the tracer gas diffuses out of the collapsing plastic bag and the pressurizing gas boils off resulting in a pressurized tracer gas atmosphere within the transport vessel. The transport vessel is now examined on the outside with respect to any tracer gas penetrating out through possible leaks in the transport vessel.

7 Claims, 1 Drawing Figure

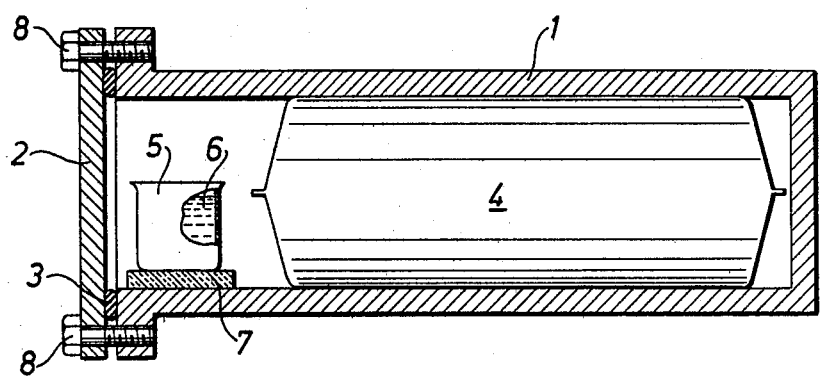

LEAK TESTING

This invention relates to leak testing of sealable containers. The invention is specifically applicable in connection with the leak testing of transport vessels for radioactive material.

Heretofore, no simple method was known for leak testing transport vessels, intended for radioactive material, which are completely sealed when the belonging lid has been brought into position. One reason for this is that, for reasons of safety, such transport vessels must not be provided with any normal outlet, any nipple, valve or similar device, which would permit the introduction in the sealed condition of test gas under pressure. Accordingly, for the leak testing of such transport vessels, these vessels have, up to now, been provided with a temporary outlet making it possible to connect temporarily the interior of each tested transport vessel to a source of test gas under pressure while the test is performed, that is to say, while an investigation is made as to whether test gas has leaked to the exterior of the transport vessel. When the leak testing has been performed, the temporary outlet has been removed and the opening in the wall of the transport vessel has been closed by welding. Although this weld is carefully checked, there is no testing of the leak tightners of the transport vessel in its final condition.

Therefore, the object of this invention is to provide a method that makes possible a simple and at the same time completely reliable way of leak testing containers which, with lid or closure in position, are completely sealed without the need for exposing the container to any mechanical operations such as welding or the like. This object is accomplished by the method according to the invention having the particular characteristics appearing from the appended claims.

Thus, the method according to the invention essentially comprises introducing, into an open container to be tested, a test or tracer gas and a pressurizing driving gas in condensed form, the latter being in gaseous form at the temperature at which the leak test is performed, thereafter sealing the container in a normal way. When the necessary pressurized test gas atmosphere has been attained inside the container, the latter is searched or examined on the outside in any conventional way in order to establish whether test gas has escaped through a possible leak.

In order to prevent the spread-out or escape of the introduced test gas from the container before it can be sealed it is suitable to introduce the test gas in a package from which the test gas is emitted essentially only after the container has been sealed. This is especially significant when helium is used as test gas because helium spreads extremely rapidly to the surrounding regions which have a low helium concentration. Advantageously, the test gas can therefore be introduced into the container in a bag or the like, which is manufactured of such material that the test gas can penetrate and escape through the wall, although only at a limited rate so that no appreciable amount manages to escape before the container has been sealed. One advantage in this connection is that the test gas can be introduced in a bag which occupies a major part of the interior of the container, whereby the air which is inside the container is to a large extent driven out and replaced by test gas. As suitable, the bag can either be inflated with gas and sealed inside the container or introduced into the container in an already inflated and sealed condition. The pressure inside the bag need not exceed atmospheric pressure.

Alternatives to helium gas as test gas are for example freon gas, neon gas and argon gas.

It will be appreciated that the use of a bag or the like also implies the advantage that the consumption of test gas, which is expensive, will be controllably low and that at every test, the amount of test gas introduced can be easily controlled.

Suitably, the pressurizing gas can be introduced into the container quite simply by placing inside the container a smaller vessel in which the pressurizing gas is contained in condensed form. The pressurizing gas can, advantageously, be nitrogen, although of course other suitable pressurizing gases such as carbon dioxide, for example, can also be used. Due to the fact that the method according to the invention includes measures that are easy to perform mechanically, it readily lends itself to automation, which can be of special value in connection with the testing of containers for radioactive material.

An embodiment of the invention will be described below in more detail with reference being to the accompanying FIGURE, which schematically illustrates the leak testing of a transport vessel intended for radioctive material, the vessel being shown in longitudinal section.

The transport vessel 1, merely schematically illustrated in the drawing, takes the form of a long and narrow hollow cylinder and is shown in the condition existing immediately after the transport vessel has been sealed by means of its lid 2 and the seal 3. Previous to sealing, a plastic bag 4, containing helium gas at atmospheric pressure and consisting of ethylene plastic through which the helium gas can diffuse, as well as a smaller vessel 5 containing liquid nitrogen 6 are placed inside the vessel. The plastic bag 4 has a diameter that is essentially the same as the inner diameter of the transport vessel while having such a length as to occupy the major part of the interior of the transport vessel, that is to say, with the exception of a forward space in which the vessel 5 with the liquid nitrogen 6 is placed. The vessel 5 is placed on a suitable insulating support 7, thus stabilizing vessel 5 and preventing cracking thereof when made of glass, for example.

Suitably the helium filled bag or hose 4 is arranged inside the transport vessel by sealing an empty piece of plastic hose of suitable length at one end to form a bag, after which the bag is introduced into the transport vessel 1, sealed end first. A nozzle from a helium source is introduced into the open end of the bag which is made to close tightly around the nozzle. The bag is now inflated with helium gas, after which the nozzle end of the bag is also sealed and the nozzle removed. Sealing at both ends can be made for example by hot sealing.

When the vessel 5 with the liquid nitrogen 6 has been placed inside the transport vessel 1 and this has been conventionally closed by means of its lid 2, seal 3 and bolts 8, the pressure within the transport vessel increases as the cooled liquid nitrogen warms up in the transport vessel and boils off while forming pressurizing gas. At the same time the helium gas diffuses through the walls of the plastic bag 4, and the latter collapses. Thus, after a short time, of the order of some minutes, a pressurized helium gas atmosphere has been achieved inside the transport vessel.

A search for leaks can now be made exteriorly of the transport vessel, especially at suspected sites of leak, in any conventional way, as for example, quite simply, by the process of sniffing.

The volume of the transport vessel 1 can, for example, be of the order of a few hundred litres and the amount of liquid nitrogen introduced can be of the order of one liter, whereupon a pressure of the order to 3 kg can be obtained within the transport vessel at normal temperature. If so desired, it is of course possible, after the closing of the transport vessel, to heat it to a given elevated temperature, in order to facilitate evaporation of the pressurizing gas, if for nothing more.

In order to check that a sufficient pressure has been achieved within the transport vessel, it is possible to introduce into the vessel also a peak value indicating manometer, possibly provided with time registration.

Other changes and modifications are, of course, also possible within the scope of the invention as defined in the appended claims.

What is claimed is:

1. A method of leak testing a sealable container, in particular a transport vessel for radioactive material, comprising introducing into the container to be tested, a test gas and a pressurizing gas in condensed form, which at the testing temperature is in the vapor state, thereafter sealing the container, and when a pressurized test gas atmosphere has been obtained within the container, searching the outside of the container for the presence of test gas escaping through possible leaks.

2. A method according to claim 1, wherein the test gas is introduced in a package from which said test gas is slowly emitted.

3. A method according to claim 2, wherein the test gas is introduced in a bag or the like of such a material that the test can diffuse out through its walls.

4. A method according to claim 3, wherein the test gas is introduced in a bag which occupies a major part of the interior of the container, whereby a major portion of the air present in the container is driven out.

5. A method according to claim 1, wherein the test gas is helium.

6. A method according to claim, wherein the pressurizing gas is nitrogen.

7. A method according to claim 4 wherein the test gas is helium.

* * * * *